United States Patent
Koizumi

(10) Patent No.: US 11,472,363 B2
(45) Date of Patent: Oct. 18, 2022

(54) DRIVER'S SIDE AIRBAG DEVICE

(71) Applicant: Autoliv Development AB, Vargarda (SE)

(72) Inventor: Akira Koizumi, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 17/226,513

(22) Filed: Apr. 9, 2021

(65) Prior Publication Data

US 2021/0316688 A1 Oct. 14, 2021

(30) Foreign Application Priority Data

Apr. 13, 2020 (JP) .................................. 2020-071595
Mar. 10, 2021 (JP) .............................. JP2021-038797

(51) Int. Cl.
*B60R 21/203* (2006.01)
*B60R 21/2342* (2011.01)
*B60R 21/2346* (2011.01)

(52) U.S. Cl.
CPC ........ *B60R 21/203* (2013.01); *B60R 21/2342* (2013.01); *B60R 21/2346* (2013.01)

(58) Field of Classification Search
CPC .............. B60R 21/203; B60R 21/2342; B60R 21/2346; B60R 21/261; B60R 2021/23384; B60R 2021/2612
See application file for complete search history.

(56) References Cited

U.S. PATENT DOCUMENTS

| 6,086,092 A * | 7/2000 | Hill ...................... B60R 21/233 |
| | | 280/743.2 |
| 6,209,911 B1 * | 4/2001 | Igawa ................ B60R 21/2346 |
| | | 280/743.1 |
| 6,612,609 B1 * | 9/2003 | Rodriguez ........... B60R 21/201 |
| | | 280/743.1 |
| 7,125,043 B2 * | 10/2006 | Amamori .............. B60R 21/217 |
| | | 280/743.1 |
| 7,152,875 B2 * | 12/2006 | Kai ....................... B60R 21/239 |
| | | 280/739 |

(Continued)

FOREIGN PATENT DOCUMENTS

| JP | H11-321506 A | | 11/1999 | |
| JP | 2011126307 A | * | 6/2011 | ......... B60R 21/2346 |
| JP | 2012153171 A | * | 8/2012 | ........... B60R 21/233 |

*Primary Examiner* — Laura Freedman
(74) *Attorney, Agent, or Firm* — Foley & Lardner LLP

(57) ABSTRACT

A driver's side airbag device 100 is provided with a diffuser 124 that is contained in an airbag cushion 104 and straightens gas flow from an inflator 112. The diffuser 124 has a connecting part 136 that is connected to the inflator 112 and one or a plurality of supply ports that supply gas received from the inflator 112 into the airbag cushion 104. The supply ports include a passenger side supply port 148 that overlaps at a predetermined location of the occupant side panel 120 of the airbag cushion 104 with the diffuser 124 contained therein. The driver's side airbag device 100 is further provided with a temporary stitched part 150 that breakably stitches the diffuser 124 and a predetermined portion of the occupant side panel 120 of the airbag cushion 104 across the occupant side supply opening 148 of the diffuser 124.

9 Claims, 6 Drawing Sheets

FIG. 2B

(56) References Cited

U.S. PATENT DOCUMENTS

| | | | | |
|---|---|---|---|---|
| 7,380,822 B2* | 6/2008 | Abe | ............... | B60R 21/233 |
| | | | | 280/743.1 |
| 8,439,395 B2* | 5/2013 | Nagai | ............... | B60R 21/2346 |
| | | | | 280/743.1 |
| 8,517,415 B2* | 8/2013 | Iida | ............... | B60R 21/237 |
| | | | | 280/743.1 |
| 8,690,185 B2* | 4/2014 | Yamaji | ............... | B60R 21/239 |
| | | | | 280/739 |
| 9,027,956 B2* | 5/2015 | Yamaji | ............... | B60R 21/203 |
| | | | | 280/743.1 |
| 9,199,601 B2* | 12/2015 | Yamaji | ............... | B60R 21/203 |
| 9,211,864 B2* | 12/2015 | Hock | ............... | B60R 21/235 |
| 9,387,822 B2* | 7/2016 | Iida | ............... | B60R 21/201 |
| 9,499,119 B2* | 11/2016 | Ishiguro | ............... | B60R 21/203 |
| 10,787,147 B2* | 9/2020 | Fujimaki | ............... | B60R 21/2338 |
| 10,899,309 B2* | 1/2021 | Hotta | ............... | B60R 21/2338 |
| 11,180,103 B2* | 11/2021 | Hess | ............... | B60R 21/2338 |
| 2006/0151976 A1* | 7/2006 | Abe | ............... | B60R 21/233 |
| | | | | 280/743.1 |

* cited by examiner

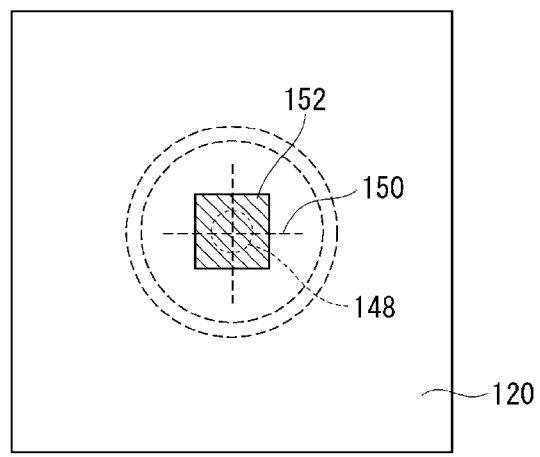
FIG. 4A
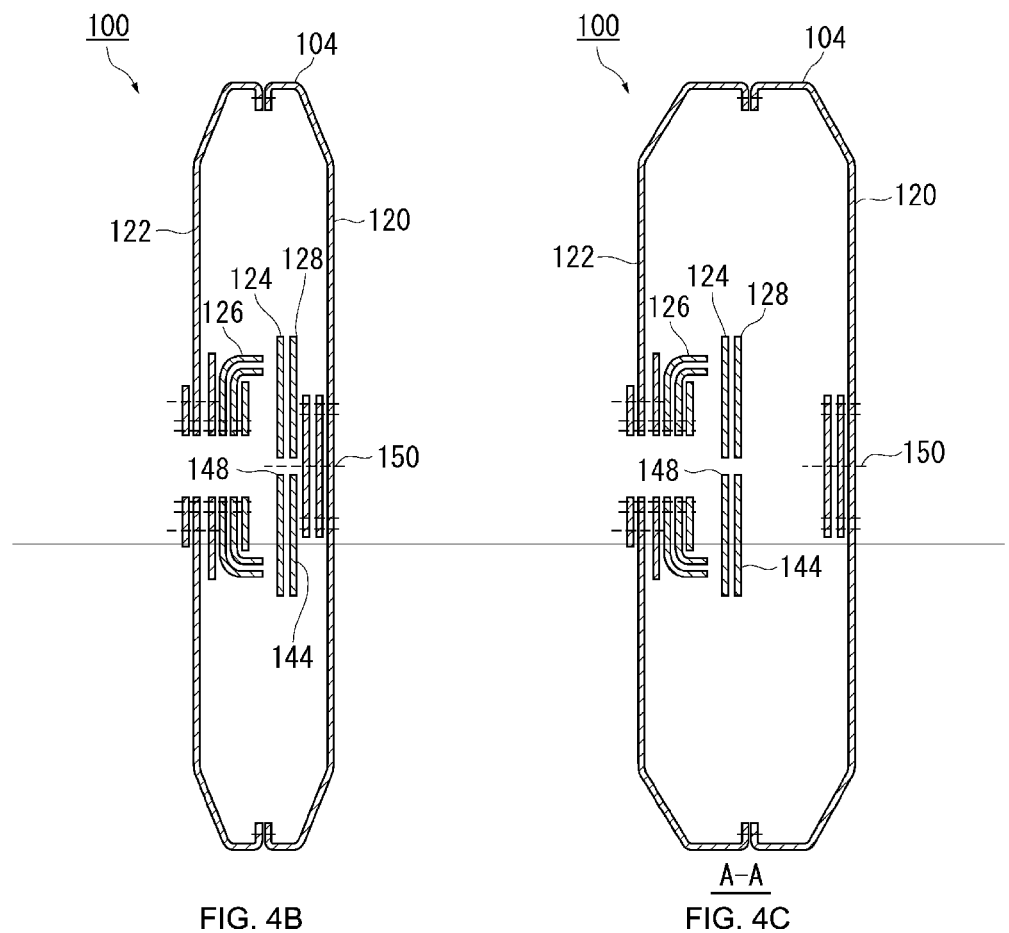
FIG. 4B
FIG. 4C
A-A

DRIVER'S SIDE AIRBAG DEVICE

TECHNICAL FIELD

The present invention relates to a drivers side airbag device having an airbag cushion that expands and deploys between a steering wheel of a vehicle and an occupant.

BACKGROUND

Currently, nearly all vehicle steering wheels are equipped with driver's side airbag devices. The airbag cushion of the driver's side airbag device is primarily housed in the central hub of the steering wheel, and expands and deploys in front of the occupant by opening a plastic cover member or the like by the expansion pressure thereof.

With various airbag devices, a bag-like member may be provided inside an airbag cushion. For example, in the passenger seat airbag device of Patent Document 1, an inner bag 41 is provided inside the outer bag 31 for the purpose of adjusting the shape of the airbag cushion. The technology of Patent Document 1 employs an inflator 21 with a two-stage output, having a construction where gas is supplied to the inner bag 41 only when the inflator 21 is operated at high output. In addition, the configuration is such that when the inner bag 41 is inflated, a tear seam 51, which is a stitched point between the inner bag 41 and the outer bag 31, tears, and the outer bag 31 further expands.

RELATED ART DOCUMENTS

Patent Documents

[Patent Document 1] Japanese Unexamined Patent Application H11-321506

SUMMARY OF THE INVENTION

In addition to the technology of Patent Document 1, a diffuser, such as a bag-shaped or tubular diffuser may be provided inside the airbag cushion for the purpose of straightening gas flow, and the airbag cushion and the diffuser may be temporarily sewn in a breakable manner similar to the aforementioned tear seam 51. However, in order to perform this type of temporary stitching in the mass production process of airbag devices, a special jig is required, increasing cost and labor, and also making it necessary to control quality variation. Therefore, a configuration that enables simpler temporary stitching of the airbag cushion and diffuser or the like is desirable.

Problem to be Solved by the Invention

In light of the foregoing, an object of the present invention is to provide a drivers side airbag device in which an airbag cushion and an internal diffuser can simply and temporarily be sewn together.

Means for Solving the Problem

In order to resolve the problem described above, a typical configuration of a driver's side airbag device according to the present invention includes an airbag cushion that expands and deploys between a steering wheel of a vehicle and an occupant, an inflator that supplies gas to the airbag cushion, and a diffuser that is contained in the airbag cushion and straightens gas flow from the inflator. The airbag cushion includes an occupant side panel arranged on the occupant side and a steering side panel arranged on the steering wheel side, and the diffuser includes a connecting part connected to the inflator and one or a plurality of supply ports for supplying gas received from the inflator into the airbag cushion, the one or more supply ports including an occupant side supply port that overlaps with a prescribed location of the occupant side panel of the airbag cushion with the diffuser contained therein, and the driver's side airbag device further includes a temporary stitched part that is breakably sewn between the diffuser and the prescribed location of the occupant side panel of the airbag cushion, across the occupant side supply opening of the diffuser.

With the temporary stitched part described above, connecting the diffuser to the occupant side panel can prevent the diffuser from being misaligned while stowed. In addition, use of the temporary stitched part stabilizes the occupant side panel and diffuser positions during the process of deployment of the airbag cushion. Therefore, gas can be supplied from the diffuser to the airbag cushion as set and also deployment behavior of the occupant side panel can be set for smooth expansion and deployment. The configuration described above enables mass production of airbag cushions of stable quality while improving the occupant restraint performance of the airbag cushion.

The temporary stitched part described above may be formed by a plurality of lines that intersect within the area of the occupant side supply port. This configuration of the temporary stitched part can be efficiently broken by the pressure of the gas from the occupant side supply port.

The occupant side supply port described above may be circular, and the temporary stitched part may be formed by two orthogonal lines in the center of the occupant side supply port. Even with this configuration of the temporary stitched part, the pressure of the gas from the occupant side supply port is applied evenly and thus the stitching can be efficiently broken.

A prescribed location of the occupant side panel of the airbag cushion described above may be marked with a prescribed color or pattern, and the temporary stitched part may be formed along the marking. By using the marking as a reference, the diffuser can easily be aligned with the occupant side panel, thereby improving work efficiency when forming the temporary stitched part.

The prescribed location described above of the occupant side panel may be near the center of the occupant side panel. Having the prescribed location near the center of the occupant panel is preferable as this will simplify alignment with the diffuser and simplify creation of the temporary stitched part.

Effect of the Invention

The present invention can provide a driver's side airbag device with simple temporary stitching between an airbag cushion and a diffuser contained therein.

BRIEF DESCRIPTION OF THE DRAWINGS

FIG. 4A is a diagram illustrating temporary stitches connecting an occupant side panel of FIG. 2A and the diffuser of FIG. 2B.

FIG. 4B is a diagram illustrating a cross-sectional view of the driver's side airbag device of FIG. 1B before activation.

FIG. 4C is a diagram illustrating a cross-sectional view of the driver's side airbag device of FIG. 1B after activation.

EMBODIMENT OF THE INVENTION

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Figure 1A:
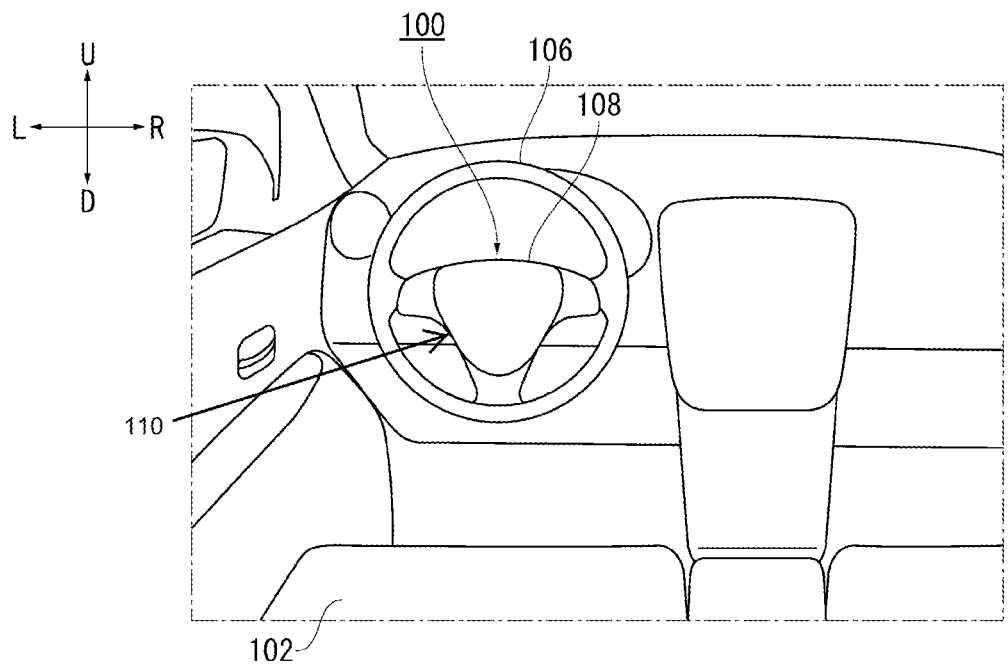
FIG. 1A is a diagram illustrating an overview of a driver's side airbag device in accordance with an embodiment of the present invention.

FIG. 1 is a diagram illustrating an overview of a driver's side airbag device 100 in accordance with an embodiment of the present invention. FIG. 1A is a diagram illustrating a state of the driver's side airbag system 100 before activation. Hereafter, regarding FIG. 1 and other diagrams, the front and back of a vehicle are illustrated by the symbols F (Front) and B (Back), the left and right sides of the vehicle by the symbols L (Left) and R (Right), and the top and bottom of the vehicles by the symbols U (Up) and D (Down).

The driver's side airbag device 100 is applied in the present embodiment as the driver airbag for the driver's seat for vehicles with a steering wheel on a left side (front row left side seat 102). Hereinafter, explanations are made assuming the front row left side seat 102, for example, the outer side of the vehicle (hereinafter, outer vehicle side) refers to the left side of the vehicle, and the inner side of the vehicle (hereinafter, inner vehicle side) refers to the right side of the vehicle.

An airbag cushion 104 (see FIG. 1B) of the drivers side airbag device 100 is folded, rolled, or the like in a predetermined stowage configuration, and stowed inside the central hub 108 of the steering wheel 106 in front of the occupant's regular seating position in the seat 102.

Figure 1B:
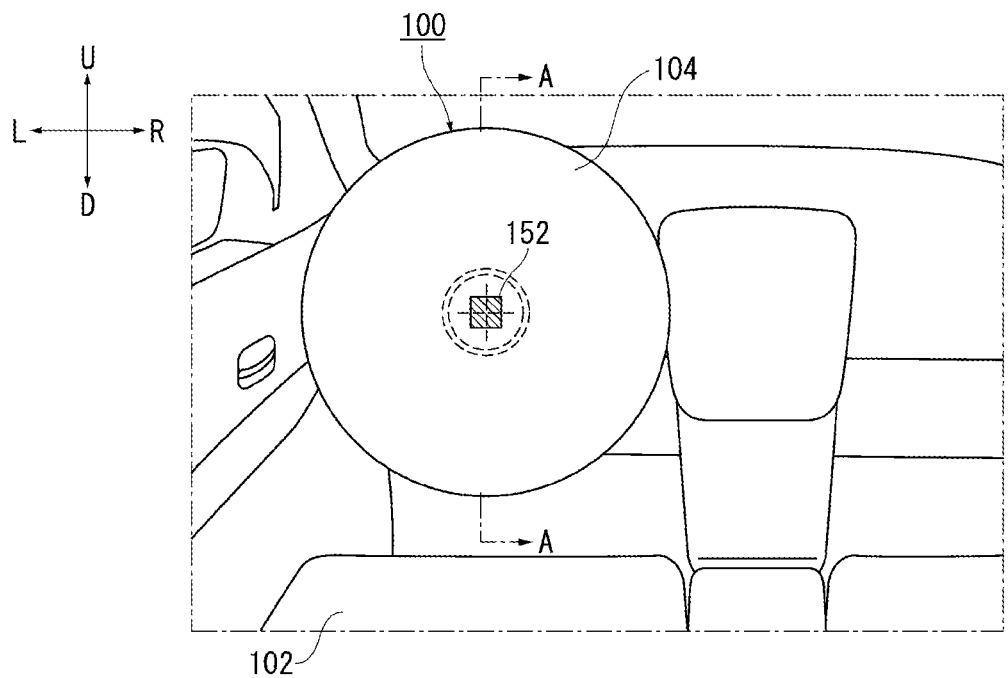
FIG. 1B is a diagram illustrating the driver's side airbag device of FIG. 1A after activation.

FIG. 1B is a diagram illustrating a state of the driver's side airbag system 100 after activation. The airbag cushion 104 begins to expand based on gas from the inflator 112 (see FIG. 2B), opening the cover member 110 of the steering wheel 106 (see FIG. 1A). The airbag cushion 104 expands and deploys in a bag shape between the steering wheel 106 and an occupant in a regular seating position in the seat 102, to restrain the upper body and head of the occupant as they attempt to move forward. The cushion 104 has a disk shape as seen from the seating position side, and is formed by overlaying a plurality of panels that form the surface and then sewing or adhering.

Figure 2A:
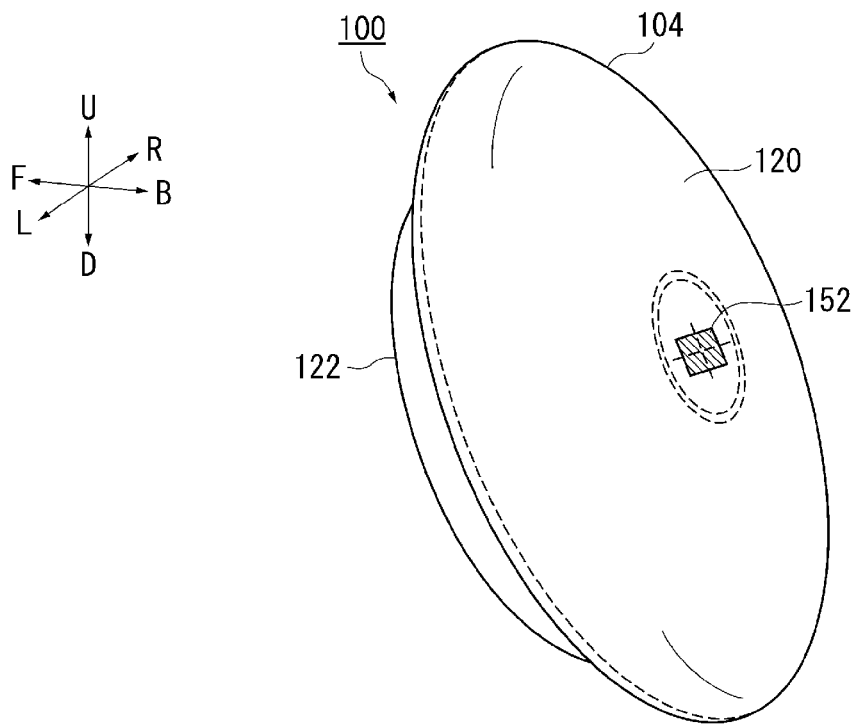
FIG. 2A is a diagram illustrating an example of the configuration of the driver's side airbag device after activation in FIG. 1B.

FIG. 2 is a diagram illustrating an example of a configuration of the drivers side airbag device 100 after activation in FIG. 1B. FIG. 2A is a diagram illustrating the airbag cushion 104 of FIG. 1B viewed from slightly above the exterior of the vehicle. The airbag cushion 104 in this embodiment expands and deploys into a slightly flattened, nearly circular shape.

The airbag cushion 104 is formed of a plurality of panels and includes an occupant side panel 120 provided on the occupant side and a steering wheel side panel 122 provided on the steering wheel 106 side (see FIG. 1A). A marking 152 is provided in a center of the occupant side panel 120, which will be described below. In addition, the steering side panel 122 is provided with a vent hole (not shown) for discharging gas externally.

Figure 2B:
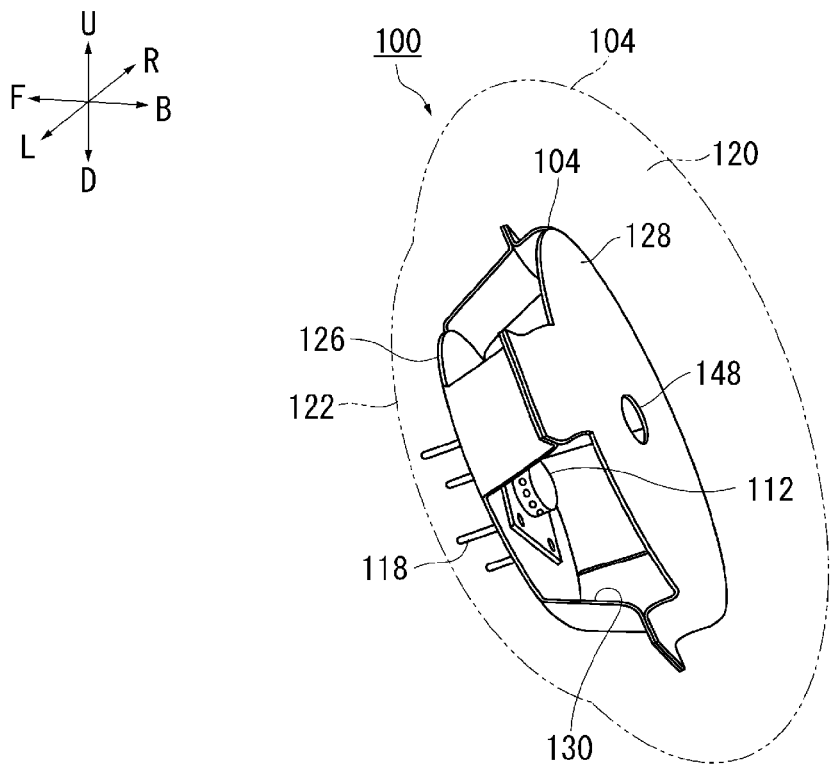
FIG. 2B is a diagram illustrating a diffuser disposed in an interior of the diver's side airbag device of FIG. 2A.

FIG. 2B is a diagram illustrating the interior of the airbag cushion 104 through the occupant side panel 120 and the steering side panel 122 of FIG. 2A. The diffuser 124 is a member that straightens the gas flow from the inflator 112, and is installed on the steering side panel 122 together with the inflator 112 and is contained within the airbag cushion 104.

The inflator 112 is a device for supplying gas, and in the present embodiment, a disk type is employed. The inflator 112 is partially inserted inside the diffuser 124 and installed with the terminals (omitted in the figure) exposed externally from the diffuser 124 and the steering side panel 122 (see FIG. 2B). The inflator 112 is activated by an impact detection signal sent from a sensor (not illustrated) and supplies gas to the airbag cushion 104 via the diffuser 124.

The inflator 112 is provided with a plurality of stud bolts 118. The stud bolts 118 pass through the diffuser 124 and the steering side panel 122 in order to fasten to the bottom of the interior of the steering wheel 106 (see FIG. 1A). By fastening the stud bolts 118, the airbag cushion 104 is secured to the steering wheel 106.

Exemplary currently prevailing inflators include: a type which is filled with a gas generating agent and burns the agent to generate gas; a type which is filled with compressed gas and supplies gas without generating heat; or a hybrid type which utilizes both combustion gas and compressed gas; etc. Any of these types of inflators can be used as the inflator 112.

Figure 3A:
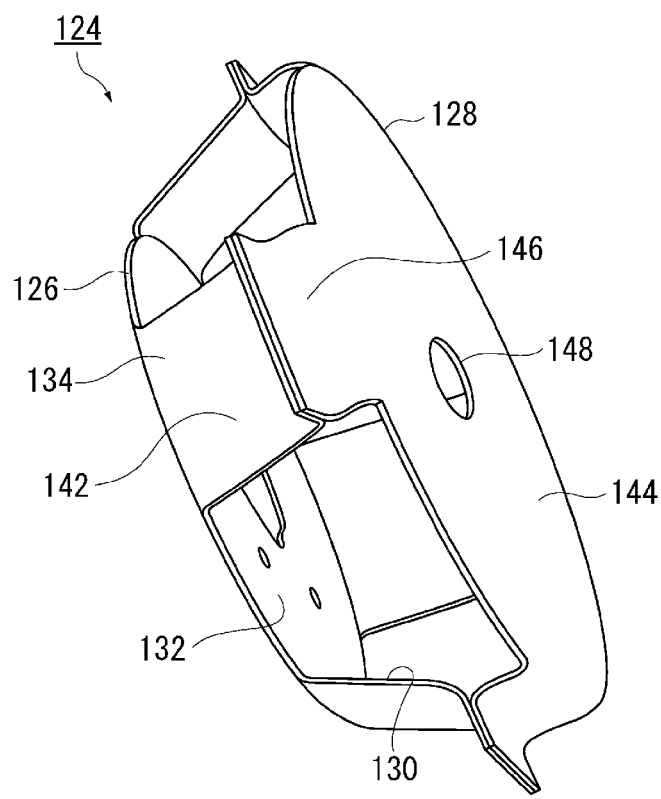
FIG. 3A is a diagram illustrating the diffuser in FIG. 2B.
Figures 3B, 3C:
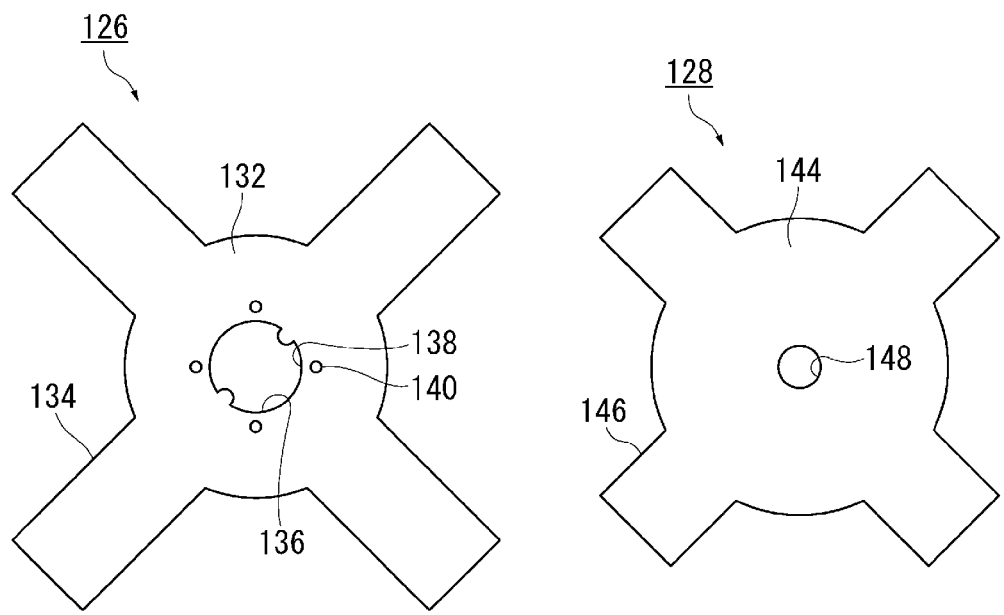
FIG. 3B is a diagram illustrating a lower panel of the diffuser of FIG. 3A.
FIG. 3C is a diagram illustrating an upper panel of the diffuser of FIG. 3A.

FIG. 3 is a diagram illustrating the diffuser 124 in FIG. 2B. FIG. 3A is a perspective view illustrating only the diffuser 124 of FIG. 3B. The diffuser 124 includes a lower panel 126 and an upper panel 128, has a plurality of gas supply ports (such as supply port 130) formed therein, and covers the inflator 112 (see FIG. 2B).

FIG. 3B is a diagram illustrating the lower panel 126 of FIG. 3A placed on a flat surface. As illustrated in FIG. 3B, the lower panel 126 has a central bottom portion 132 and four leg parts 134. The bottom portion 132 has a connecting part 136 in the center to which the inflator 112 (see FIG. 2B) is connected. The connecting part 136 includes an opening 138 that exposes the terminals of the inflator 112 and bolt holes 140 provided around the aperture 138, through which stud bolts 118 pass. The leg parts 134 are connected to the leg parts 146 of the upper panel 128 to form a column 142 of the diffuser 124.

FIG. 3C is a diagram illustrating the upper panel 128 of FIG. 3A placed on a flat surface. The upper panel 128 has a center top surface part 144 and four leg parts 146. The top surface part 144 has an occupant side supply port 148 formed in the center. The occupant side supply port 148 is a circular through-hole that supplies gas toward the occupant side panel 120 of the airbag cushion 104 (see FIG. 3B), and is one of the supply ports of the diffuser 124, similar to the supply port 130 (see FIG. 3A).

In this embodiment, prior to activation of the inflator 112 (see FIG. 2B), in order to prevent misalignment of the diffuser 124, the vicinity of the occupant side supply port 148 of the diffuser 124 is temporarily stitched to the occupant side panel 120 of the airbag cushion 104 using a temporary stitched part 150 (see FIG. 4A).

FIG. 4 is a diagram illustrating the temporary stitched part 150 connecting the occupant side panel 120 of FIG. 2A and the diffuser 124 of FIG. 2B. FIG. 4A is an enlarged view of the vicinity of the marking 152 with the occupant side panel 120 of FIG. 2A placed on a flat surface.

In this embodiment, the occupant side supply port 148 of the diffuser 124 (FIG. 3A) is provided to overlap the marking 152 of the occupant-side panel 120 when the airbag cushion 104 with the diffuser 124 contained therein is placed on a flat surface with the occupant side panel 120 up. The marking 152 is formed as a rectangle of a darker color, such as dark blue or black, and is provided near the center of the occupant side panel 120. By using the marking 152 as a reference, the diffuser 124 can easily be aligned with the center vicinity of the occupant side panel 120, thereby improving work efficiency when forming the temporary stitched part 150.

The temporary stitched part 150 is a part where temporary stitching is formed that is broken by causing the thread to break or unravel when a certain amount of force is applied. The temporary stitched part 150 connects the diffuser 124 to the occupant side panel 120 of the airbag cushion 104 by a line that crosses the occupant side supply port 148 of the diffuser 124 (see FIG. 2B). The temporary stitched part 150 crosses the occupant side supply port 148 and is designed to be broken when the inflator 112 is activated and gas pressure is applied from the occupant side supply port 148.

In addition, the temporary stitched part 150 is formed along the marking 152 of the occupant side panel 120. The marking 152 is provided near the center of the occupant side panel 120, which is preferable for simple formation of the temporary stitched part 150.

FIG. 4B is a diagram illustrating a view of the drivers side airbag device 100 of FIG. 1B at the A-A cross section before the inflator 112 (see FIG. 2B) is activated. As described above, prior to activation of the inflator 112, the top surface part 144 of the upper panel 128 of the diffuser 124 is connected to the occupant side panel 120 of the airbag cushion 104 by the temporary stitched part 150 across the occupant side supply port 148.

With this driver's side airbag device 100, the diffuser 124 can be prevented from shifting position while stowed, by connecting the diffuser 124 to the occupant side panel 120 using the temporary stitched part 150. Accordingly, the driver's side airbag device 100 eliminates the need for a dedicated jig or the like to hold the position of the diffuser 124 during the process of folding the airbag cushion 104, thereby contributing to simplification of work and cost reduction.

FIG. 4C is an A-A cross-section of the driver's side airbag device 100 of FIG. 1B, and illustrates the driver's side airbag device 100 of FIG. 4B after the inflator 112 (see FIG. 2B) is activated. As described above, the temporary stitched part 150 is broken by the gas pressure applied to the occupant side supply port 148, and the airbag cushion 104 expands and unfolds with the occupant side panel 120 separated from the diffuser 124.

Use of the temporary stitched part 150 stabilizes the occupant side panel 120 and diffuser 124 positions during the process of deployment of the airbag cushion 104. Therefore, gas can be supplied from the diffuser 124 to the airbag cushion 104 as set, and the deployment behavior of the occupant side panel 120 can be adjusted for smooth expansion and deployment. As described above, the temporary stitched part 150 enables simple temporary stitching of the diffuser 124 and the occupant side panel 120 of the airbag cushion 104, and enables mass production of the airbag cushion 104 with stable quality while improving the occupant restraint performance of the airbag cushion 104.

The temporary stitched part 150 illustrated in FIG. 4A is not limited to two orthogonal lines, but can also be formed by diagonally intersecting lines or one line or a plurality of two or more lines. Even these temporary stitches can be efficiently broken by pressure of the gas by providing them across the occupant side supply port 148. In addition, the marking 152 is not limited to a square, but can also be implemented by other shapes, patterns, or even other colors.

MODIFIED EXAMPLES

Modified examples of each of the above-described components are described below. In each of FIG. 5 and FIG. 6, the same signs are attached to the same components as those described above, and a description of the aforementioned components are omitted. In the following description, components having the same name as a component already described are assumed to have the same function unless otherwise specified, even if marked with a different sign.

Figure 5A:
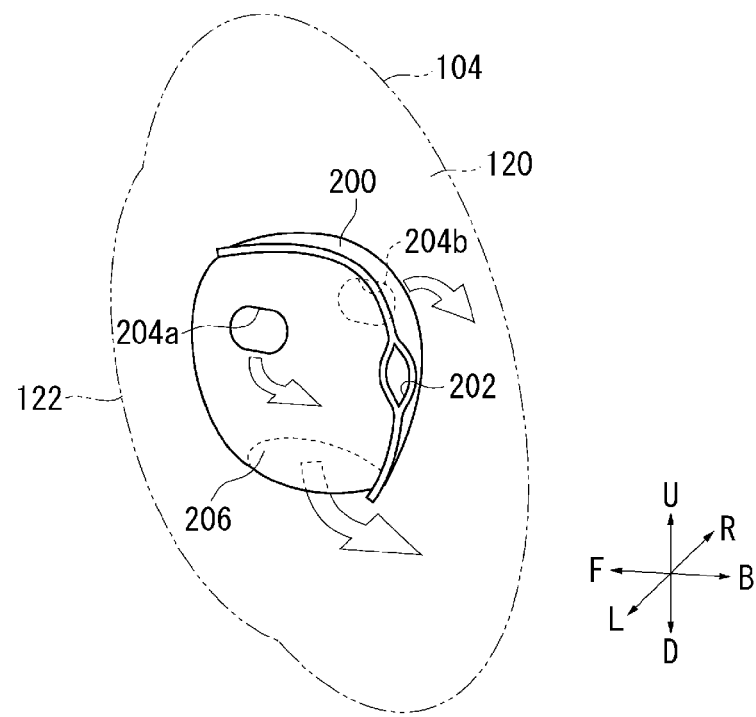
FIG. 5A is a diagram illustrating a first modified example of the diffuser in FIG. 2B.

FIG. 5 is a diagram illustrating a first modification (diffuser 200) of the diffuser 124 of FIG. 2B. FIG. 5A is a diagram illustrating a diffuser 200 corresponding to FIG. 2B. The diffuser 200 has side supply ports 204a, 204b and lower supply port 206, in addition to the occupant side supply port 202, as supply ports to supply gas from the inflator 112 (see FIG. 2B). In this diffuser 200, the occupant-side supply port 202 is also temporarily stitched to the occupant side panel 120 of the airbag cushion 104 by the temporary stitched part 150 (see FIG. 4A).

Figure 5B:
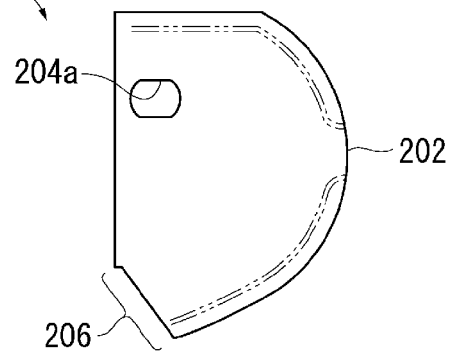
FIG. 5B is a diagram illustrating a side view of the diffuser of FIG. 5A.

FIG. 5B is a diagram illustrating the diffuser 200 of FIG. 5A from the side. The diffuser 200 is formed in the shape of a bag by sewing, and the lower side edge is open to form the lower supply port 206. The stitches on the occupant side (right side in FIG. 5B) are broken to form the occupant side supply port 202.

The lower supply port 206 is formed having a larger diameter than the side supply ports 204a, 204b and the occupant side supply port, and has a greater volume of gas passing through than the side supply ports 204a, 204b and the like. This causes the cushion 104 (see FIG. 5A) to expand and deploy preferentially from the bottom. With this configuration, the lower part of cushion 104 can, for example, be inserted between the steering wheel 106 (see FIG. 1A) and the abdomen or chest of the occupant at an early stage and can provide protection.

Figure 5C:
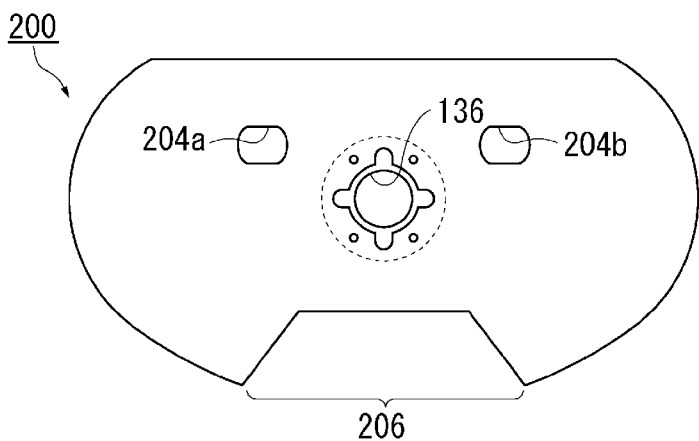
FIG. 5C is a diagram illustrating the diffuser of FIG. 5A laid flat.

FIG. 5C illustrates the diffuser 200 of FIG. 5B without the stitches removed and spread out on a flat surface. The diffuser 200 is provided with a connecting part 136 for the inflator 112 at the center (see FIG. 2B), and is secured to the steering side panel 122 (see FIG. 2A) together with the inflator 112.

FIG. 6 is a diagram illustrating a second modification (diffuser 220) of the diffuser 124 of FIG. 2A. The diffuser 220 differs in configuration from each of the above diffusers in that in entirety, the diffuser is a flat circular shape. The diffuser 220 also has an occupant side supply port 222 as well as side supply ports 204a, 204b and a lower supply port 206. With this diffuser 220, the occupant-side supply port 222 is also temporarily stitched to the occupant side panel 120 of the airbag cushion 104 by the temporary stitched part 150 (see FIG. 4A).

Figure 6A:
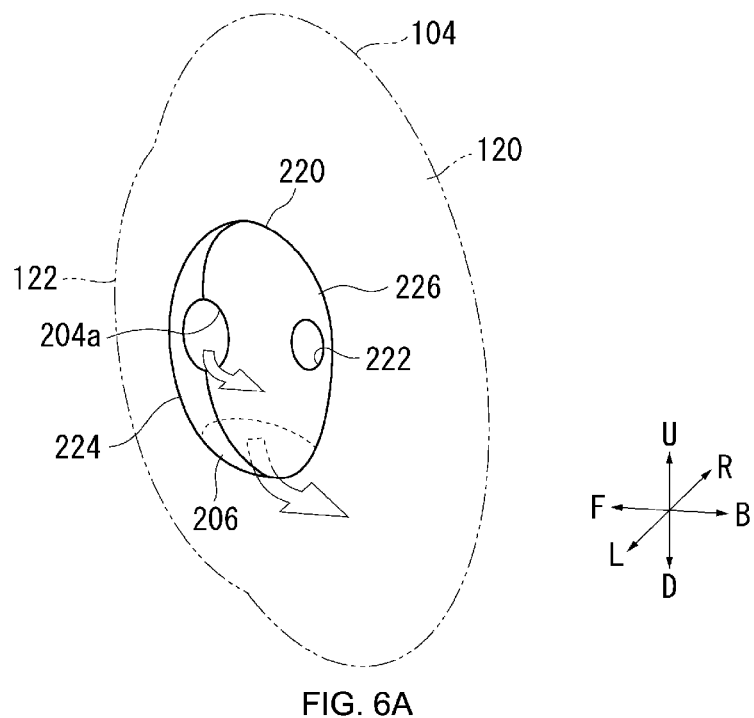
FIG. 6A is a diagram illustrating a second modified example of the diffuser in FIG. 2B.
Figure 6B:
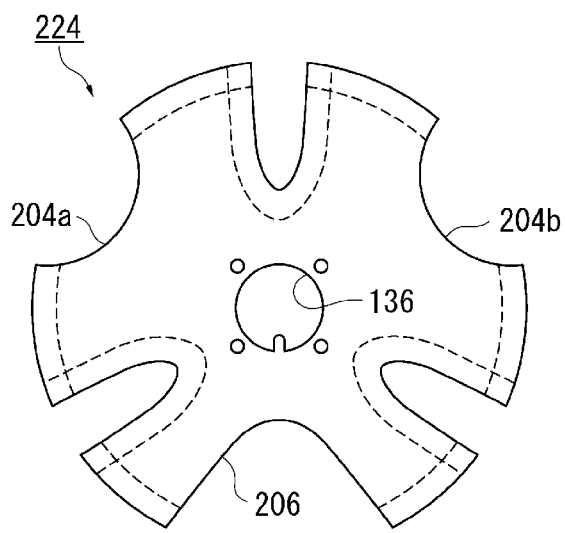
FIG. 6B is a diagram illustrating a lower panel of the diffuser of FIG. 6A laid flat.

FIG. 6B illustrates the lower panel 224 of the diffuser 220 of FIG. 6A spread out on a flat surface. The lower panel 224 has a connecting part 136 in the center and cutouts along the side supply ports 204a, 204b and lower supply port 206 on the left, right and lower edges, as well as cutouts to make the diffuser 220 round.

Figure 6C:
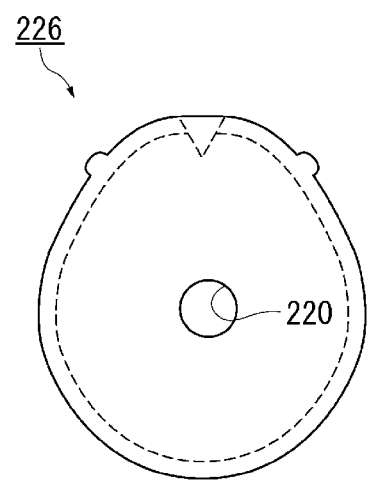
FIG. 6C is a diagram illustrating an upper panel of the diffuser of FIG. 6A laid flat.

FIG. 6C illustrates the upper panel 226 of the diffuser 220 of FIG. 6A spread out on a flat surface. The upper panel 226 is approximately circular and the diffuser 220 (see FIG. 6A) can be created by joining the edges thereof to the lower panel 224 (FIG. 6B). The upper panel 226 also has an occupant side supply port 222 in the center.

In addition to the diffusers 200 and 220 of the above modifications, other examples such as a diffuser in which the side supply ports 204a and 204b are omitted and in which supply ports capable of releasing gas toward the upper and lower portions of the airbag cushion are provided in addition to the occupant side supply ports are also feasible. For any of these diffusers, the temporary stitched part 150 enables simple temporary stitching of the diffuser and the occupant side panel 120 of the airbag cushion 104, and enables mass production of the airbag cushion 104 with stable quality while improving the occupant restraint performance of the airbag cushion 104.

Preferred examples of the present invention were described above while referring to the accompanying drawings. However, the embodiments described above are preferred examples of the present invention, and other embodiments can be implemented or performed by various methods. In particular, unless described otherwise in the specification of the present application, the invention is not restricted to the shape, size, configurational disposition, and the like of parts illustrated in detail in the accompanying drawings. Furthermore, expressions and terms used in the specification of the present application are used for providing a description, and the invention is not limited thereto, unless specifically described otherwise.

Therefore, it is obvious that a person with ordinary skill in the art can conceive of various changed examples or modified examples within the scope described in the scope of the claims, which is understood to naturally belong to the technical scope of the present invention.

INDUSTRIAL APPLICABILITY

The present invention can be used as a driver's side airbag device provided with an airbag cushion that expands and deploys between a steering wheel of a vehicle and an occupant.

EXPLANATION OF CODES

100 . . . driver's side airbag device, 102 . . . seat, 104 . . . airbag cushion, 106 . . . steering wheel, 108 . . . hub, 112 . . . inflator, 118 . . . stud bolt, 120 . . . occupant side panel, 122 . . . steering side panel, 124 . . . diffuser, 126 . . . lower panel, 128 . . . upper panel, 130 . . . supply port, 132 . . . bottom portion, 134 . . . leg part, 136 . . . connecting part, 138 . . . opening, 140 . . . bolt hole, 142 . . . column, 144 . . . top surface part, 146 . . . leg part, 148 . . . occupant side supply port, 150 . . . temporary stitched part, 152 . . . marking, 200 . . . diffuser of the first modification, 202 . . . passenger side supply port, 204a, 204b . . . side supply port, 206 . . . lower supply port, 220 . . . diffuser of the second modification, 222 . . . occupant side supply port, 224 . . . lower panel, 226 . . . upper panel

The invention claimed is:

1. A driver's side airbag device comprising:
an airbag cushion configured to expand and deploy between a steering wheel of a vehicle and an occupant;
an inflator that supplies gas to the airbag cushion; and
a diffuser that straightens gas flow from the inflator contained within the airbag cushion;
the airbag cushion including:
an occupant side panel arranged on an occupant side of the vehicle, and
a steering side panel arranged on a steering wheel side of the vehicle,
the diffuser including:
a first panel including a connecting part connected to the inflator;
a second panel connected to the first panel by two or more leg parts, wherein spaces between the two or more leg parts form or a plurality of supply ports for supplying gas received from the inflator into the airbag cushion, wherein the second panel includes an occupant side supply port that overlaps with the occupant side panel of the airbag cushion at a prescribed location with the diffuser contained within the airbag cushion, and
the driver's side airbag device further includes a temporary stitched part that is breakably stitched across the occupant side supply port of the diffuser at the prescribed location of the occupant side panel of the airbag cushion.

2. The driver's side airbag device according to claim 1, wherein the temporary stitched part is formed by a plurality of lines intersecting within an area of the occupant side supply port.

3. The driver's side airbag device according to claim 2, wherein the occupant side supply port is circular and
the temporary stitched part is formed by two orthogonal lines at a center of the occupant side supply port.

4. The driver's side airbag device according to claim 1, wherein the prescribed location of the occupant side panel of the airbag cushion is marked with a prescribed color or pattern, and
the temporary stitched part is formed along the marking.

5. The driver's side airbag device according to claim 2, wherein the prescribed location of the occupant side panel of the airbag cushion is marked with a prescribed color or pattern, and
the temporary stitched part is formed along the marking.

6. The driver's side airbag device according to claim 3, wherein the prescribed location of the occupant side panel of the airbag cushion is marked with a prescribed color or pattern, and
the temporary stitched part is formed along the marking.

7. The driver's side airbag device according to claim 4, wherein the prescribed location of the occupant side panel is near a center of the occupant side panel.

8. The driver's side airbag device according to claim 5, wherein the prescribed location of the occupant side panel is near a center of the occupant side panel.

9. The driver's side airbag device according to claim 6, wherein the prescribed location of the occupant side panel is near a center of the occupant side panel.

\* \* \* \* \*